(12) United States Patent
Badger

(10) Patent No.: US 11,187,203 B2
(45) Date of Patent: Nov. 30, 2021

(54) WIND TURBINES, WIND TURBINE BLADES, AND METHODS FOR MANUFACTURING WIND TURBINE BLADES

(71) Applicant: Vestas Wind Systems A/S, Aarhus N. (DK)

(72) Inventor: Paul Badger, Salisbury (GB)

(73) Assignee: Vestas Wind Systems A/S, Aarhus N. (DK)

( * ) Notice: Subject to any disclaimer, the term of this patent is extended or adjusted under 35 U.S.C. 154(b) by 172 days.

(21) Appl. No.: 15/779,281

(22) PCT Filed: Nov. 30, 2016

(86) PCT No.: PCT/DK2016/050403
§ 371 (c)(1),
(2) Date: May 25, 2018

(87) PCT Pub. No.: WO2017/092766
PCT Pub. Date: Jun. 8, 2017

(65) Prior Publication Data
US 2018/0355842 A1    Dec. 13, 2018

(30) Foreign Application Priority Data

Nov. 30, 2015 (DK) ............................ PA 2015 70779

(51) Int. Cl.
*F03D 1/06* (2006.01)
*B33Y 80/00* (2015.01)

(52) U.S. Cl.
CPC ............ *F03D 1/0675* (2013.01); *B33Y 80/00* (2014.12); *F05B 2230/20* (2013.01);
(Continued)

(58) Field of Classification Search
CPC ... F03D 1/0675; B33Y 80/00; F05B 2240/302
See application file for complete search history.

(56) References Cited

U.S. PATENT DOCUMENTS 7,393,184 B2 * 7/2008 Cairo ...................... F03D 1/065
                                                    416/225
7,891,947 B2 * 2/2011 Chen ..................... F03D 1/0675
                                                    416/225
(Continued)

FOREIGN PATENT DOCUMENTS

CN      102483032 A    5/2012
CN      102734084 A    10/2012
(Continued)

OTHER PUBLICATIONS

European Patent Office, Examination Report in EP Application No. 16808904.3, dated Feb. 27, 2020.
(Continued)

*Primary Examiner* — Michael L Sehn
(74) *Attorney, Agent, or Firm* — Wood Herron & Evans LLP

(57) ABSTRACT

A wind turbine blade includes a plurality of layered sections coupled together end-to-end. Each section includes a side wall that forms a tubular structure and includes at least one bore. When the sections are coupled together, the bores generally align to form a conduit. A strengthening element extends through the conduit and is configured to reinforce the blade under load during use of the wind turbine. A wind turbine includes a tower, a nacelle, and a rotor including a hub and at least one wind turbine blade including a plurality of layered sections extending from the hub. A method of forming a wind turbine blade through an additive manufacturing process is also disclosed.

23 Claims, 9 Drawing Sheets

(52) U.S. Cl.
CPC ... *F05B 2230/60* (2013.01); *F05B 2240/2211* (2013.01); *F05B 2240/302* (2013.01); *F05B 2280/6003* (2013.01); *Y02E 10/72* (2013.01); *Y02P 70/50* (2015.11)

(56) References Cited

U.S. PATENT DOCUMENTS

| | | | | |
|---|---|---|---|---|
| 7,976,275 | B2* | 7/2011 | Miebach | F03D 1/0675 416/212 R |
| 8,376,713 | B2* | 2/2013 | Kawasetsu | F03D 1/0675 416/226 |
| 8,662,853 | B2* | 3/2014 | Vasudeva | F03D 1/0675 416/226 |
| 9,797,369 | B2* | 10/2017 | Kratmann | F03D 1/0633 |
| 2010/0143143 | A1 | 6/2010 | Judge | |
| 2010/0143148 | A1 | 6/2010 | Chen et al. | |
| 2010/0260612 | A1 | 10/2010 | Vasudeva et al. | |
| 2012/0027608 | A1 | 2/2012 | Martinez | |
| 2012/0027612 | A1 | 2/2012 | Yarbrough | |
| 2012/0141287 | A1 | 6/2012 | Hynum et al. | |
| 2012/0159785 | A1* | 6/2012 | Pyles | B29C 33/3842 29/889.7 |
| 2012/0269643 | A1* | 10/2012 | Hibbard | F03D 1/0675 416/226 |
| 2015/0152839 | A1 | 6/2015 | Busbey et al. | |
| 2015/0167633 | A1* | 6/2015 | Tobin | F03D 1/0675 416/229 R |
| 2015/0316028 | A1* | 11/2015 | Brekenfeld | F03D 1/0675 416/229 R |

FOREIGN PATENT DOCUMENTS

| | | |
|---|---|---|
| EP | 1950414 A2 | 7/2008 |
| EP | 2746574 A2 | 6/2014 |
| EP | 2881237 A1 | 6/2015 |
| EP | 2881580 A1 | 6/2015 |
| EP | 2930350 A1 | 10/2015 |
| WO | 2009130467 A2 | 10/2009 |

OTHER PUBLICATIONS

European Patent Office, International Search Report and Written Opinion in PCT Application Serial No. PCT/DK2016/050403, dated Feb. 10, 2017.

Danish Patent and Trademark Office, Search and Examination Report in PA 2015 70779, dated Jun. 15, 2016.

China National Intellectual Property Administration, First Notification of Office Action in CN Application No. 201680080344.5, dated Jul. 16, 2019.

* cited by examiner

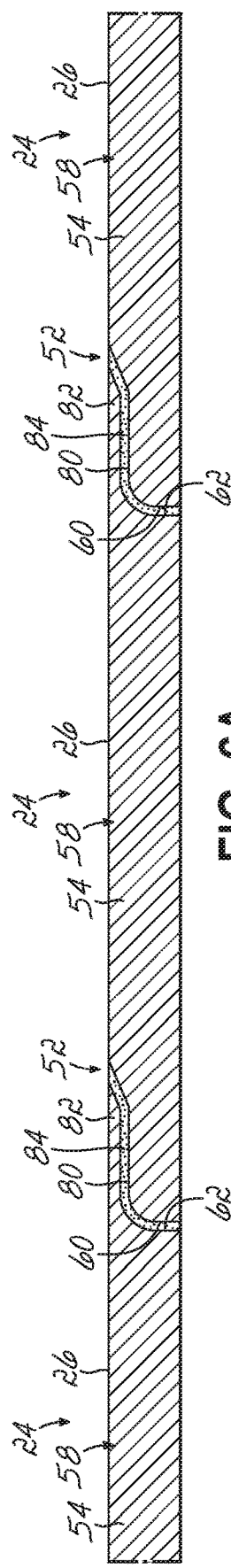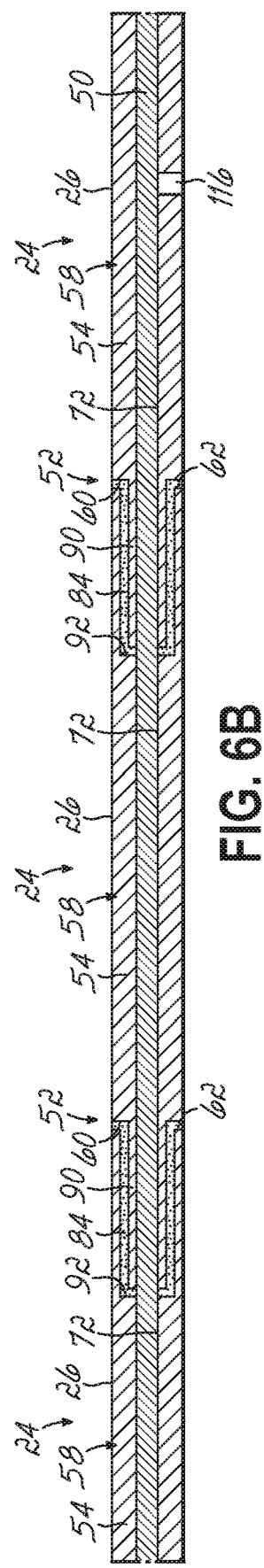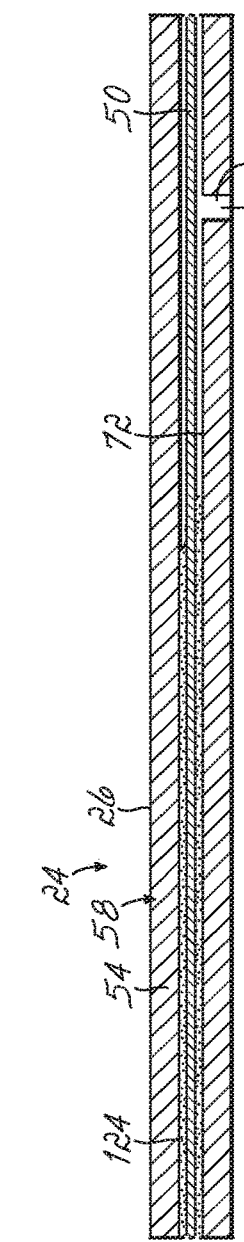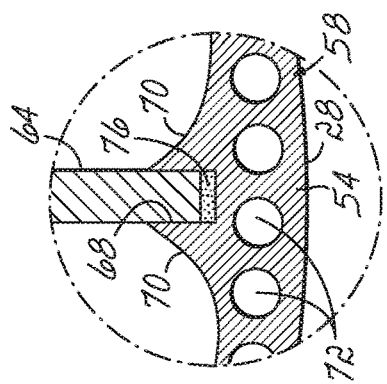

WIND TURBINES, WIND TURBINE BLADES, AND METHODS FOR MANUFACTURING WIND TURBINE BLADES

TECHNICAL FIELD

This application relates generally to wind turbines, and more particularly to wind turbine blades and methods for manufacturing wind turbine blades.

BACKGROUND

Wind turbines are used to produce electrical energy using a renewable resource and without combusting a fossil fuel. Generally, a wind turbine converts kinetic energy into mechanical energy and then subsequently converts the mechanical energy into electrical energy. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and extending radially therefrom.

Generally, electrical energy production from a wind turbine increases with the size of the wind turbine. Therefore, modern multi-megawatt wind turbines are massive structures and the trend toward larger structures continues. These massive structures are assembled from component parts. As such, many wind turbines have their various component parts delivered in separate pieces to the site of the wind turbine installation. For example, the wind turbine tower, which may be formed by a number of tower sections, may be delivered to the installation site. The nacelle may be delivered to the installation site and mounted on the tower following its assembly. Lastly, the blades, themselves being quite massive in size, may be transported individually to the installation site. Each wind turbine blade is raised and secured to a rotor hub normally via a pitch bearing whereby the load from the wind turbine blade is transferred to the rotor hub.

The massive turbine blades are complex structures unto themselves. They are often constructed of a shell, spar caps, and one or more shear webs. The shell is typically a layered composite and forms the exterior surface of the blade that has an aerodynamic foil shape and that encloses the shear webs and spar caps, which provide the structural aspects of the blade. The shear webs and spar caps may take the form of an internal spar that enables the shell to resist flap and edgewise loading during use of the blade.

Conventional wind turbine blades are typically produced by a manually intensive production process. In addition, production of large wind turbine blades requires a large amount of capital in the form of large facilities and mold making equipment. In one such process, two large-scale molds must first be produced. The molds define the shape of the wind turbine blade. Each mold forms approximately one half of the shell of the wind turbine blade.

Once the molds are manufactured, a laminate structure that forms the shell of the wind turbine blade is produced from each mold by placing a fiber-resin composite in the mold. A process that may include vacuum infusion may be utilized to infuse a fabric, such as a glass or carbon fiber fabric, with resin in the mold. Robots and other automation may be used to assist in this process and to reduce the otherwise manually intensive process of laying up the molds. The resin is then cured.

The cured fiber-resin composite structure conforms to the mold surface so as to form one-half of the shell of the wind turbine blade. With the aid of cranes, the two shell halves are extracted from their respective molds and bonded together. Alternatively, the two shell halves may be bonded together while in their respective molds. Once bonded, the blades are finished. These large turbine blades are then transported from the manufacturing facility to the installation site, which may be hundreds to thousands of kilometers away.

As is generally described above, conventional manufacturing techniques require a large capital investment, large factories, and long lead times. Initial mold production is one constraint on producing even larger blades. Because of their size, the molds are manufactured at a centralized facility. The necessity of producing molds and having large centralized factories within which to produce the wind turbine blades consumes capital. Furthermore, to keep the cost of the blades economically feasible with this process, many blades must be produced from the mold set in order to distribute the expense of the molds and factories across a large number of blades. As a result, there is little, if any, flexibility with regard to implementing new wind turbine blade designs once the mold set is complete. Centralized manufacturing from molds also drives the costs for transporting the wind turbine blades up due to the complexity of the logistics and the specialized equipment required to transport large, long blades over significant distances. Overall, with a centralized mold manufacturing process, the cost of producing blades, the lack of flexibility to adopt new blade designs, and the transportation costs can limit adoption of wind turbine technology.

Accordingly, there is a need for improved wind turbine blades and methods for manufacturing wind turbine blades that reduce the capital investment required and eliminate the predominantly centralized factory system and transportation issues while also reducing lead times and being more accepting of changes in wind turbine blade design.

SUMMARY OF THE INVENTION

To address these and other drawbacks, a wind turbine blade includes a plurality of layered sections coupled together end-to-end. A plurality of said sections includes a side wall that forms a tubular structure that includes at least one bore formed therein. In some embodiments, each said section may have a bore therein. When the sections are coupled together end-to-end, the bores of adjacent layered sections generally align to form a conduit along the plurality of sections. The wind turbine blade further includes at least one strengthening element that extends through the conduit formed in the plurality of layered sections. The strengthening element is configured to reinforce the blade under load during use of the wind turbine. In accordance with one embodiment, a wind turbine includes a tower, a nacelle disposed adjacent a top of the tower, and a rotor including a hub and at least one wind turbine blade including a plurality of layered sections as described above extending from the hub.

In an aspect of the invention, the sections may be formed through an additive manufacturing process, wherein the sections are formed in layers. For example, each layered section has a longitudinal axis and at least one of the layered sections may include a layer deposited by the additive manufacturing process and generally define a plane substantially perpendicular to the longitudinal axis. In one embodiment, at least one layered section includes an integral receptacle and a separate structural component is secured to the tubular structure within the integral receptacle. In this regard, the integral receptacle may include feet projecting from the side wall so as to define a trough therebetween, and the separate structural component may include a panel that is secured to the section in the trough and divides the tubular structure into at least two tubular portions. In another embodiment, the integral receptacle may include a socket and the separate structural component may include a rod that is received in the socket.

In one embodiment, the wind turbine blade includes a pressure surface and a suction surface and at least one of the layered sections includes a layer with a peripheral edge forming a portion of the pressure surface and a portion of the suction surface. In one embodiment, at least one of the sections includes a web dividing the tubular structure into at least two tubular portions. The web may be integrally formed with the tubular structure, for example. In one embodiment, the wind turbine blade includes a pressure surface and a suction surface and bores are located proximate each of the pressure surface and the suction surface on opposite sides of the web. Moreover, the side wall may include a plurality of reinforcing structures that are encased within the material of the side wall. Additionally or alternatively, the side wall may include a plurality of voids that reduce the weight of the sections without jeopardizing the structural integrity of the section.

In one embodiment, the side wall of each section terminates in opposing ends, and a joint is formed between the end of one section and the end of an adjacent section. For example, the end of the one section and the end of the adjacent section may overlap longitudinally at the joint. In this regard, at least a portion of the end of the one section includes a projecting portion and at least a portion of the end of the adjacent section includes a recess and the at least one bore extends through the projecting portion and opens within the recess.

According to another aspect of the present invention, a method of manufacturing a wind turbine blade having a plurality of sections comprises producing digital data defining a three-dimensional model of the wind turbine blade. The three-dimensional model may be divided into a plurality of sections. The method further includes manufacturing the plurality of sections based on the digital data by a process that includes depositing a material, in accordance with the digital data, layer by layer in a plurality of layers. Each layer of the material is in the shape of a two-dimensional cross section of the three-dimensional model. The layers are stacked in a third dimension to define a side wall in the form of a tubular structure having a longitudinal length and including at least one bore that extends at least a portion of the longitudinal length of the section. The method further includes assembling each section end-to-end with the at least one bore of adjacent layered sections being generally aligned with each other to form a conduit through the plurality of sections and inserting a longitudinal strengthening element into the conduit.

In one embodiment, depositing further includes depositing a first layer of a material in a plane generally perpendicular to a longitudinal axis of the section and the first layer forms one end of the section. The method may further include injecting a resin to fill voids between the longitudinal strengthening element and the conduit and securing the strengthening element within the conduit. Moreover, in accordance with the method, depositing the material further includes depositing the material so as to form an integral receptacle, and installing a separate structural component into the integral receptacle. Furthermore, the method may further include depositing material so as to embed voids within the side wall.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 6A is a cross-sectional view of a portion of a wind turbine blade taken along section line 6A-6A of FIG. 4 according to one embodiment of the invention;

FIG. 6B is a cross-sectional view of a portion of a wind turbine blade taken along section line 6B-6B of FIG. 4 according to one embodiment of the invention;

FIG. 8A is an elevation view of a portion of a segment shown in FIG. 5B following assembly of a web panel according to one embodiment of the invention;

FIG. 9A is a schematic representation of bonding the longitudinal strengthening element within one or more sections according to one embodiment of the invention.

DETAILED DESCRIPTION

Figure 1:
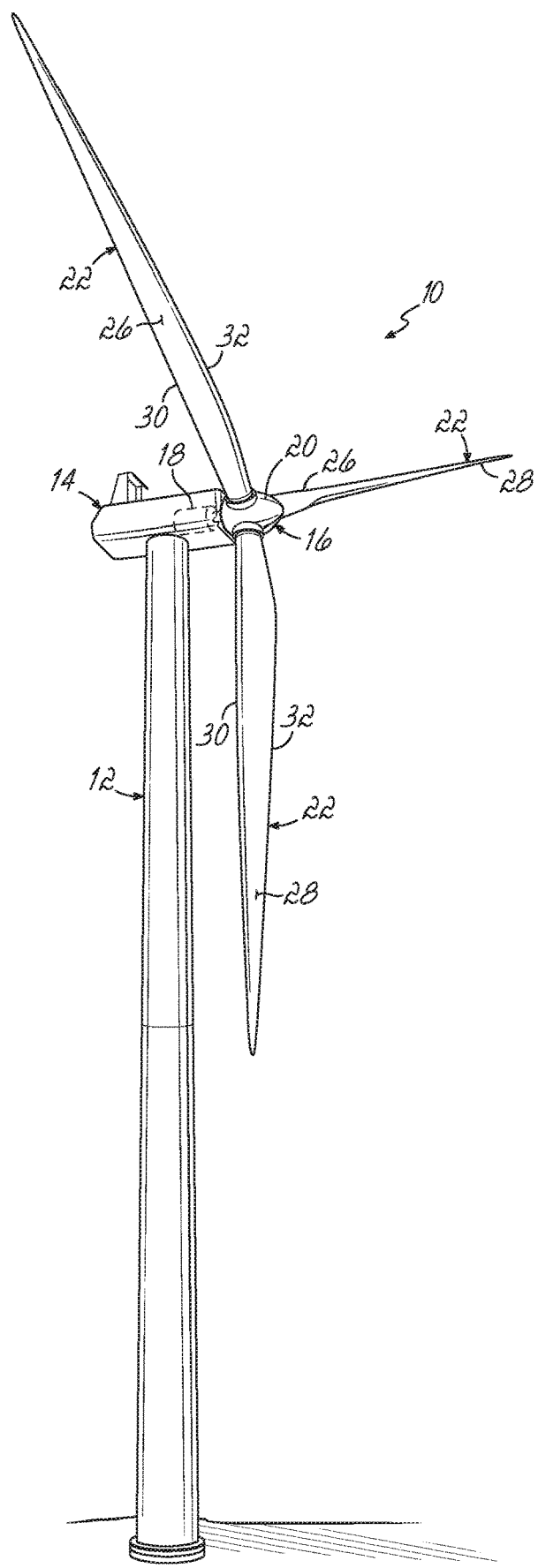
FIG. 1 is a perspective view of a wind turbine according to one embodiment of the invention.

With reference to FIG. 1, in an exemplary embodiment of the invention, a wind turbine 10 includes a tower 12, a nacelle 14 disposed at the apex of the tower 12, and a rotor 16 operatively coupled to a generator 18 housed inside the nacelle 14. The rotor 16 of wind turbine 10 includes a central hub 20 and a plurality of wind turbine blades 22 that project outwardly from the central hub 20 at locations circumferentially distributed around the hub 20. As shown, the rotor 16 includes three wind turbine blades 22, but the number of blades may vary from one wind turbine to another. The wind turbine blades 22 are configured to interact with air flow to produce lift that causes the rotor 16 to spin generally within a plane defined by the wind turbine blades 22.

According to embodiments of the invention, one or more of the wind turbine blades 22 may be assembled from a plurality of sections 24 (shown in FIG. 2), described in detail below, made according to an additive manufacturing technique. By way of example only, not limitation, one or more of the sections 24 may be produced by a layering process, such as VAT photopolymerization, stereolithography (SL), digital light processing (DLP), selective laser sintering (SLS), selective laser melting (SLM), electron beam melting (EBM), binder jetting, material jetting, direct metal layer sintering (DMLS), or fused deposition modeling (FDM), to name only a few. These processes utilize computer controlled deposition of individual layers of material based on a computer model of a part. The deposited layers are based on discrete cross sections of the model as determined by slicing the model into a finite number of individual model layers. Each model layer is then reproduced by depositing a layer of material from a 3-D printer. By constructing each layer, one layer on a preceding layer, the computer model of the part is used to manufacture a real part. These 3-D printing processes may utilize various materials including thermoplastics, thermosetting resins, metals, and combinations thereof, and other materials.

Figure 8:
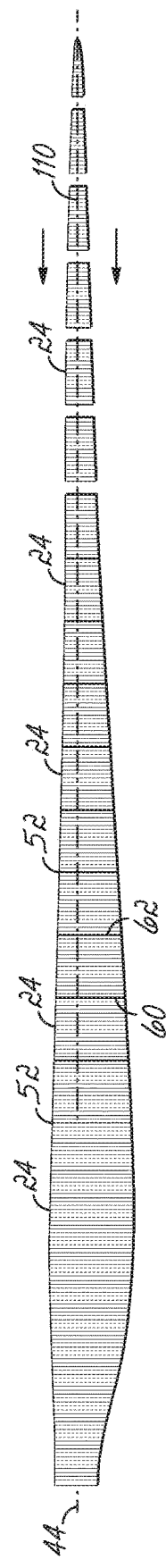
FIG. 8 is a schematic representation of assembling of the sections manufactured according to the embodiment shown in FIG. 7.

In this regard, as is described below, the individual sections 24 may be produced separately by printing them one layer at a time, the layers being oriented generally perpendicular to a longitudinal axis of the wind turbine blade 22. Once the sections 24 are built, the sections 24 may be coupled together in series to construct the wind turbine blade 22 (as is shown in FIG. 8 and described herein). Advantageously, individual production of the sections 24 may enable localized manufacturing of the wind turbine blades 22 at the construction site of the wind turbine 10. This reduces or eliminates problems associated with transporting the wind turbine blades 22 from a centralized blade manufacturing facility. Moreover, 3-D printing of the sections 24 eliminates the necessity, lead time, and expense of large molds. Because the sections 24 are produced from a moldless process, changes in the wind turbine blade design may be incorporated quickly and easily into one or more of the sections 24. While 3-D printing processes are described herein, other manufacturing techniques (e.g., manual build, injection molding, etc.) may be used to manufacture the sections 24.

To these and other ends, and with continued reference to FIG. 1, in addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found. The rotor 16 of the wind turbine 10, which is represented as a horizontal-axis wind turbine, serves as the prime mover for the electromechanical system. Wind exceeding a minimum level will activate the rotor 16 and cause rotation in a substantially perpendicular direction to the wind direction. This rotation activates the generator 18 which then produces electrical energy.

The wind turbine 10 may be included among a collection of similar wind turbines belonging to a wind farm or wind park (not shown) that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical energy is supplied from the generator 18 to the power grid as known in the art.

Figure 2:
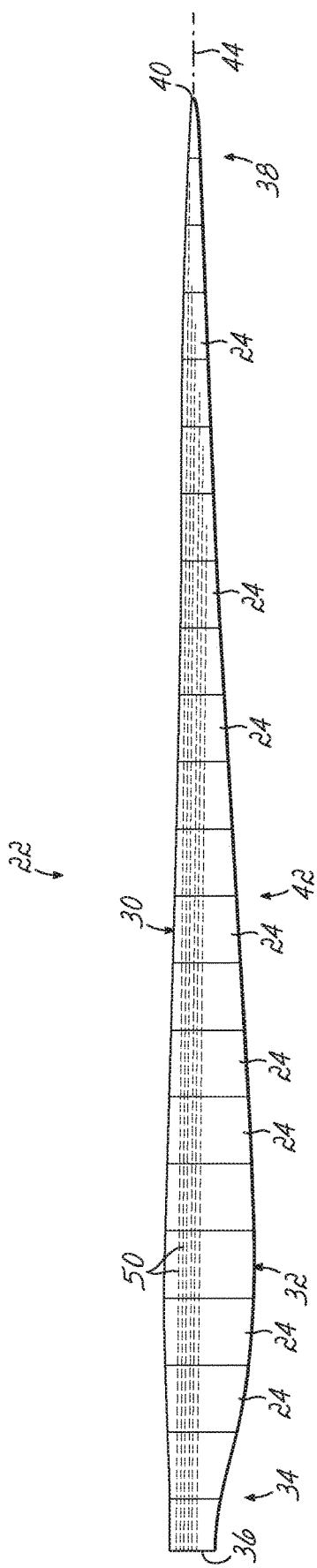
FIG. 2 is a plan view of a wind turbine blade according to one embodiment of the invention.

With reference to FIGS. 1 and 2, air flowing over the wind turbine blade 22 produces lift between a suction surface 26 and a pressure surface 28 of the wind turbine blade 22 to cause the rotor 16 to rotate. As is understood in fluid dynamics, air flowing over the wind turbine blade 22 forms a boundary layer that may separate from the outer surface of the wind turbine blade 22 between a leading edge 30 of the wind turbine blade 22 and a trailing edge 32 of the wind turbine blade 22, depending on air speed, geometry (e.g., angle of attack), or other factors. The leading edge 30 and the trailing edge 32 may extend from a root region 34 of the wind turbine blade 22 including an end 36 also known as a root end, at which location the wind turbine blade 22 is secured to the rotor 16, to a tip region 38 including a tip 40 of the wind turbine blade 22. A mid span region 42 extends between the root region 34 and the tip region 38.

Figure 3:
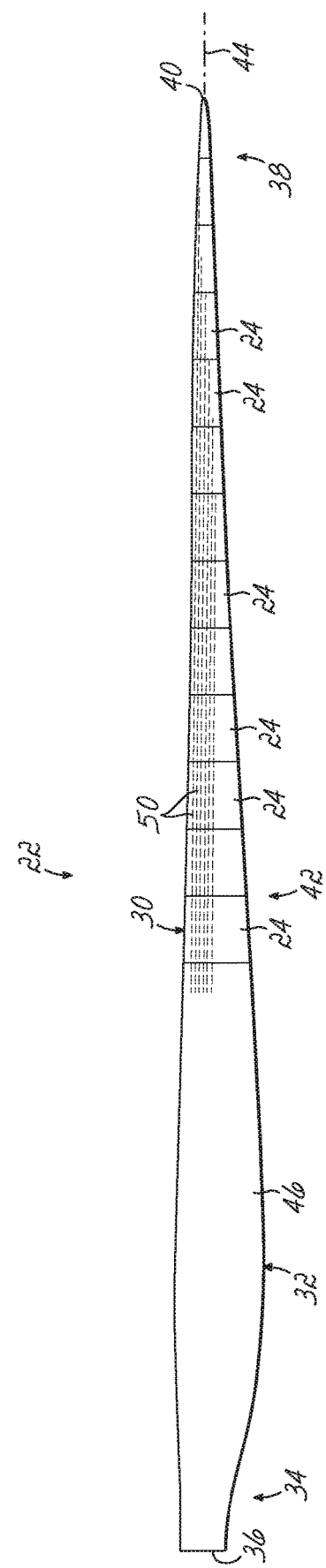
FIG. 3 is a plan view of a wind turbine blade according to one embodiment of the invention.

With reference to FIG. 2, the sections 24 are relatively small as compared to the length of the wind turbine blade 22 and form building blocks of the wind turbine blade 22. The sections 24 may be manufactured separately as is described below and be of a modular-type construction that, when arranged along an axis 44 and linked together, forms the working surfaces 26, 28 and edges 30, 32 of the wind turbine blade 22. The axis 44 may correspond to the longitudinal axis of the wind turbine blade 22 when assembled. As is shown in FIG. 2, the entire length of the wind turbine blade 22 from the end 36 to the tip 40 may be constructed of sections 24 having approximately equal longitudinal length, though embodiments of the invention are not limited to each section 24 having approximately equal length. When linked together, each section 24 forms at least a longitudinal length portion of the wind turbine blade 22. By way of example only, the individual span-wise sections 24 may be about 1 meter to about 2 meters in length though embodiments of the present invention are not limited to any specific length. For example, as is shown in FIG. 3, the wind turbine blade 22 may be assembled from a relatively large main body 46 that forms the root region 34 of the wind turbine blade 22. Sections 24 may form the mid span region 42 and the tip region 38. The large main body 46 may be produced according to conventional techniques (i.e., with a mold). Alternatively, the main body 46 may itself be a section having a larger longitudinal length than the smaller sections 24 that form the mid span region 42 and the tip region 38. Other arrangements of the sections 24 are possible and embodiments of the invention are not limited to the arrangements shown in FIGS. 2 and 3.

With continued reference to FIG. 2, in one embodiment, the wind turbine blade 22 may include strengthening elements 50 (shown in hidden line) that extend from the root region 34 or root end 36 to near or into the tip region 38 and may be generally parallel to the axis 44. When used, each strengthening element 50 extends through multiple sections 24, preferably at least three sections 34, still further preferably at least five or at least ten or at least twenty or more sections. As noted above, the sections 24 may define the exterior surface that produces a load from interaction with the wind. The strengthening elements 50 then carry that load and transfer it to the rotor 16. The material of the strengthening elements 50 may be characterized as having a greater elastic modulus than the material of the sections 24 so as to provide structural support to the sections 24. The strengthening elements 50 may be a unidirectional fiber material that bears a majority of the wind load on the wind turbine blade 22 and transfers that load to the rotor 16. The strengthening elements 50 may be rods of a material different from the material of the 3-D printed sections 24. By way of example only, and not limitation, the rods may be carbon fibers that provide anisotropic strength properties to the wind turbine blade 22. The rods may be approximately 25 mm in diameter though embodiments of the present invention are not limited to this specific dimension. With reference to FIG. 3, in one embodiment, the strengthening elements 50 may be anchored in the main body 46 and extend from the main body 46 through each of the individual sections 24 in a similar manner as that shown for FIG. 2.

Figure 4:
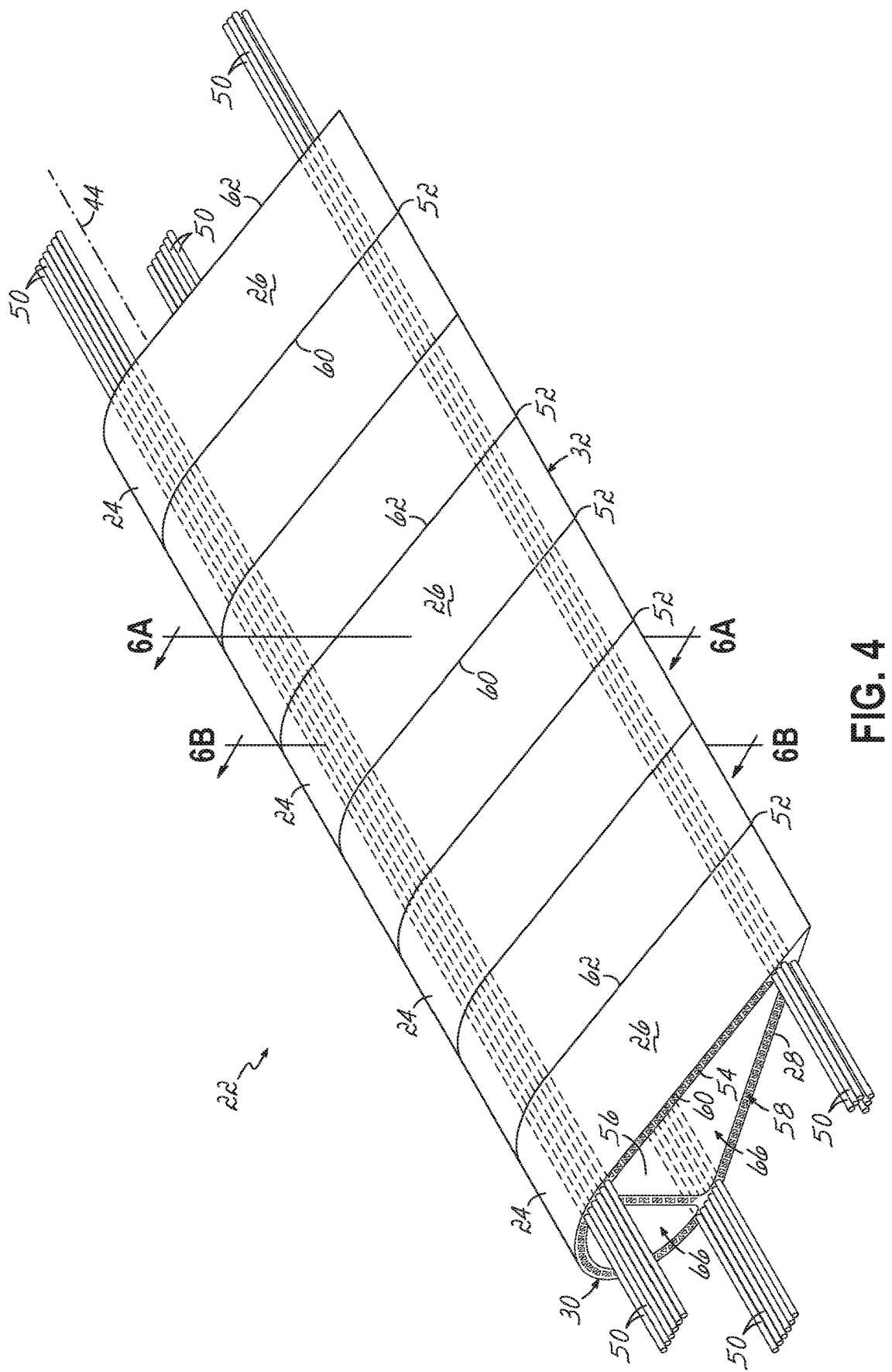
FIG. 4 is a perspective view of a portion of the wind turbine blade shown in FIG. 3 with multiple span-wise sections according to one embodiment of the invention.

With reference to FIG. 4, adjacent sections 24 abut one another and, if necessary, may be linked together at joints 52. The joints 52 (described in detail below with reference to FIGS. 6A and 6B) may be mechanical and/or chemical. When the sections 24 are assembled, the assembly effectively produces the continuous exterior surfaces 26 and 28 between the leading edge 30 and the trailing edge 32 of the wind turbine blade 22. Although not apparent from FIG. 4, each of the sections 24 may be unique and thus may not be exactly interchangeable with one another. It will be appreciated that variation in dimension between adjacent sections may be small so that smooth and continuous surfaces 26, 28 are produced (i.e., the surfaces are aerodynamically clean). Because of the uniqueness of each section 24, the sections 24 may have a predetermined order for their assembly, as is described below with reference to FIG. 8.

Figure 5:
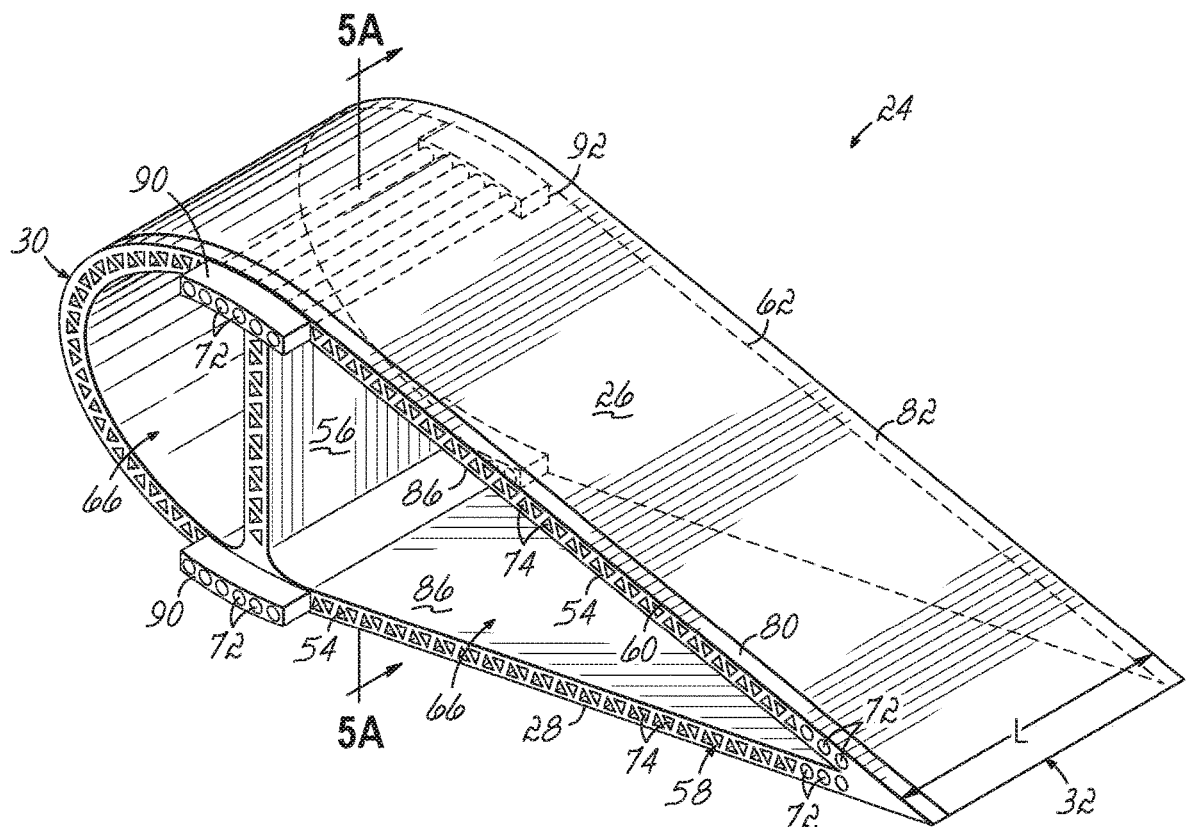
FIG. 5 is a perspective view of one section of the wind turbine blade shown in FIG. 4 according to one embodiment of the invention.
Figure 5A:
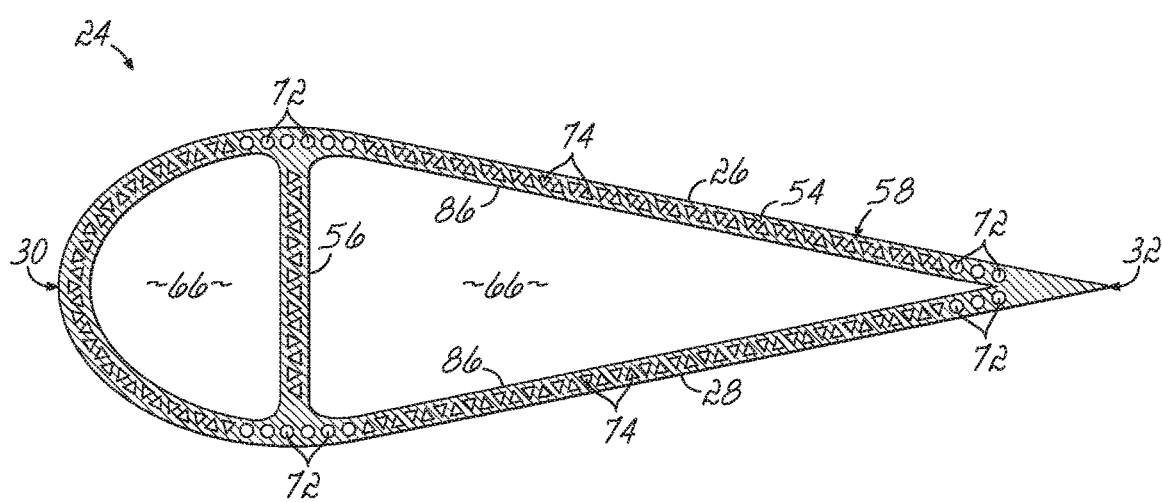
FIG. 5A is an elevation view of the section shown in FIG. 5 according to one embodiment of the invention.
Figure 5B:
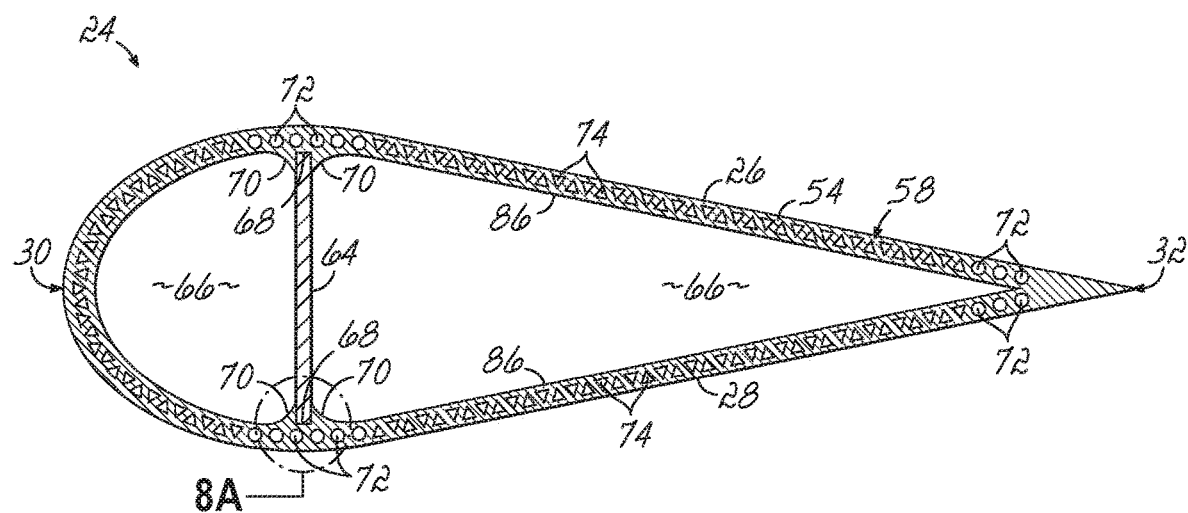
FIGS. 5B-5E are elevation views of a section according to embodiments of the invention.

With reference to FIGS. 5 and 5A, each section 24 may include a side wall 54 that is continuous and generally defines a tubular structure 58 having a closed or substantially closed cross-sectional shape between a root end 60 and a tip end 62. The side wall 54 may be 3-D printed to be net shape or near net shape (and thus may require only minimal finishing, if any, when assembled into the wind turbine blade 22). The side wall 54 may define a portion of each of the surfaces 26 and 28 and the edges 30 and 32 of the wind turbine blade 22. While not being strictly limited to any particular orientation, in the exemplary embodiment shown, the ends 60, 62 are generally parallel with one another and define a section length, L, therebetween. In this regard, the ends 60, 62 may define planes that are generally perpendicular to the axis 44 (shown in FIG. 4). As is described in detail below, at least a portion of each end 60, 62 may be configured to form the joint 52 with an adjacent section.

With continued reference to FIGS. 5 and 5A, in one embodiment, one or more of the sections 24 may also include a web 56 extending across the tubular structure 58. The web 56, or so-called shear web, may divide the interior volume of the section 24 into two or more smaller tubular portions 66 open at each end 60, 62. The web 56 braces the side wall 54 to resist collapse of the tubular structure 58 during use of the wind turbine blade 22. In particular, the web 56 may improve the shear load carrying capability of the wind turbine blade 22. In one embodiment, the same 3-D printing process may be used to net or near net shape print the web 56 to be integral with the side wall 54.

With reference now to FIGS. 5B-5F, alternative embodiments of the sections 24 are shown. In particular, and with reference to FIGS. 5B and 8A, instead of an integral web 56 (FIG. 5A), a flat panel 64 may be inserted into the tubular structure 58 defined by the side wall 54. As shown, the flat panel 64 may divide the tubular structure 58 in the same way as the web 56 shown in FIG. 5A and, in that regard, may also function as a shear web to brace the side wall 54 and improve the shear load carrying capability of the wind turbine blade 22. The flat panel 64 may be a laminate composite of a glass fiber-foam sandwich combination. The side wall 54 may include one or more troughs 68 defined between opposing built-in feet 70 that are 3-D printed so as to be integral with and extend from the side wall 54. As with the webs 56, the printing process may print the opposing feet 70 to be net shape or near net shape and define the trough 68 therebetween. In other words, the feet 70 may produce receptacles or sockets or seats that are built to be integral with the side wall 54. These built-in features may receive other separate, structural supports that are then bonded, such as by adhesive, to the side wall 54 and form part of the section 24. While the flat panel 64 is shown to be confined to the section 24, it will be appreciated that the flat panel 64 may be longer than the section 24 and so may extend outwardly beyond one or both ends 60, 62 of the section 24. In that regard, during assembly of the blade, described below, the flat panel 64 may span and thus reinforce two or more sections 24.

The flat panel 64 may be secured within the trough 68 with an adhesive 76, for example polyurethane adhesive, prior to assembly of the wind turbine blade 22 (FIG. 8A). Although not shown, it will be appreciated that the trough 68 may alternatively be formed as a local thin region in the side wall 54 which may appear as a recess in cross-section.

Figure 5C:
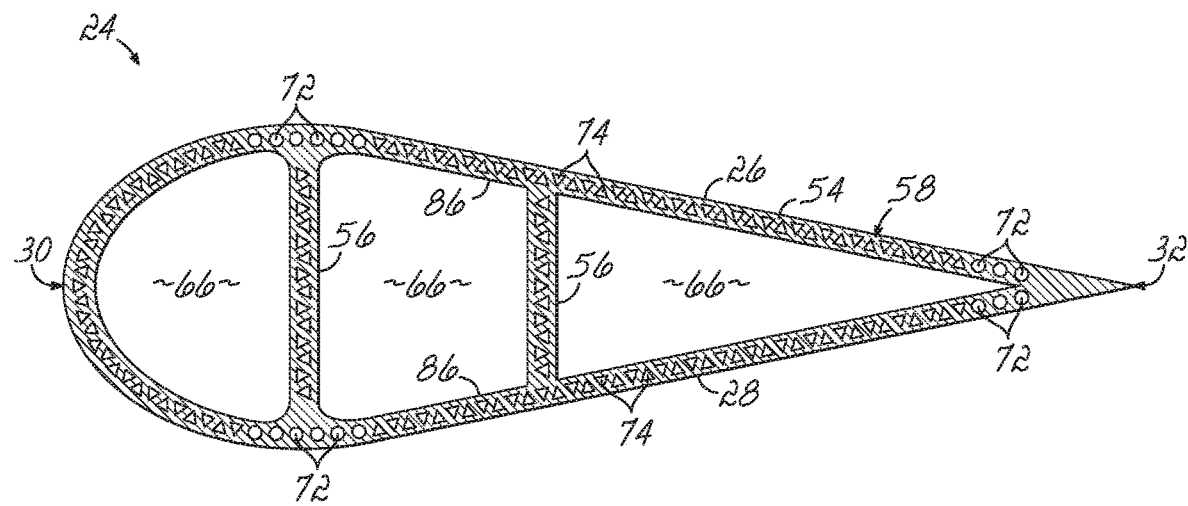
Figure 5D:
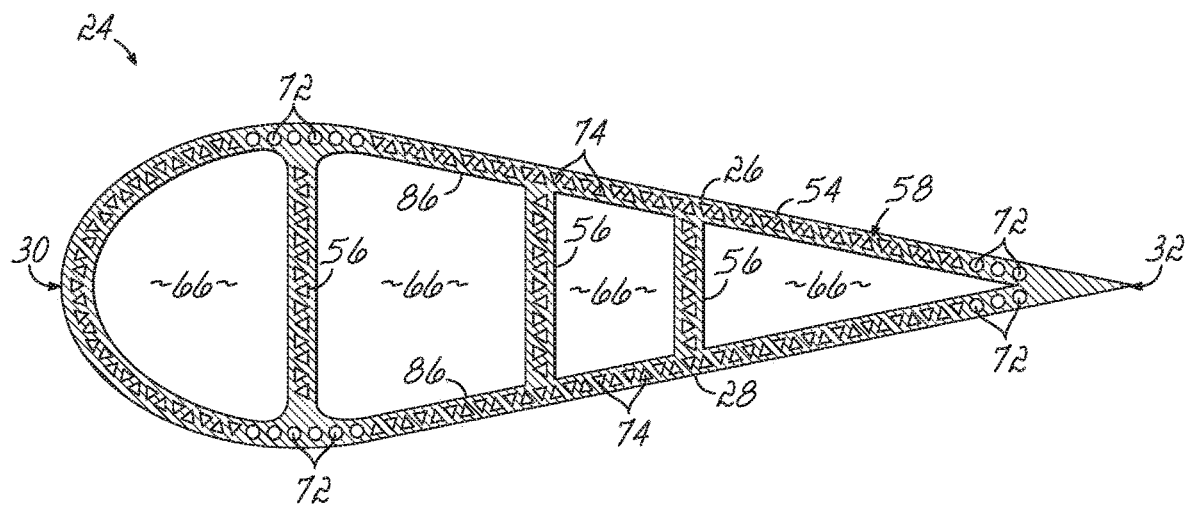

With reference now to FIGS. 5C and 5D, in one embodiment, multiple integral webs 56 may be formed within the tubular structure 58 and may further divide the tubular structure 58 into multiple tubular portions 66. Each of the webs 56 may be integrally formed during the same printing process used to manufacture the tubular structure 58. While the webs 56 are shown in FIGS. 5C and 5D and described as being integrally formed, one or more of the webs 56 may be a separate element, similar to flat panel 64 of FIG. 5B, that is inserted into the tubular structure 58. In this case, by way of example only, and although not shown, the tubular structure 58 may include multiple opposing troughs 68 defined by built-in feet 70 (or similar structure) that later receive a separately manufactured flat panel 64. It will be appreciated that the number and arrangement of the webs 56 is not limited to those shown in FIGS. 5A-5F and may depend on the structural strength of the side wall 54, length of the wind turbine blade 22, and the number and location of any strengthening elements 50.

Figure 5E:
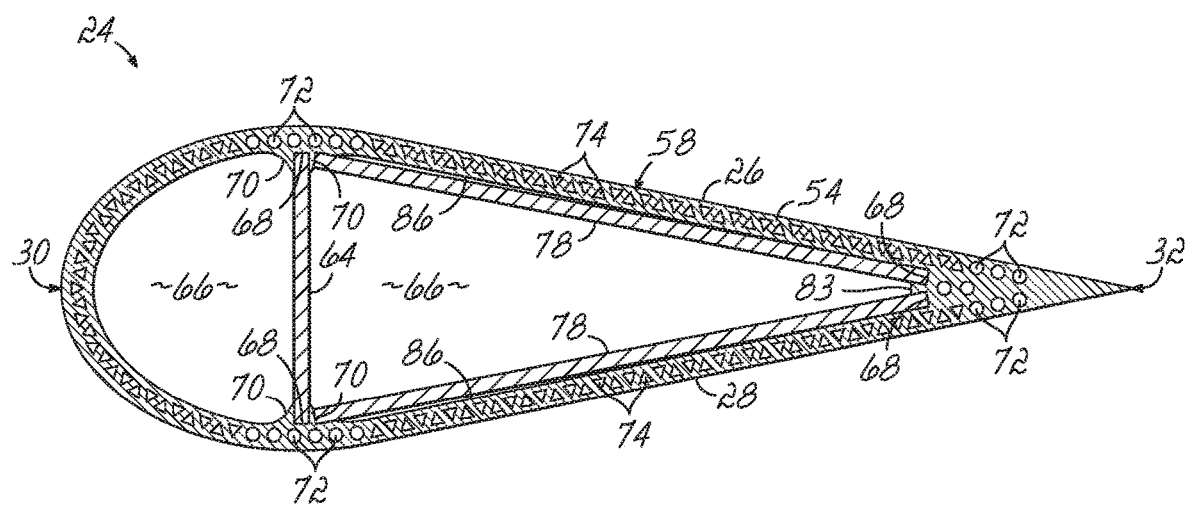

In one embodiment, and with reference to FIG. 5E, additional built-in receptacles, similar to the feet 70, may be printed adjacent the trailing edge 32 to receive one or more trailing edge panels 78. In FIG. 5E, two trailing edge panels 78 are joined to the side wall 54 at two troughs 68 proximate the edge 32. As shown, a projection 83 near the trailing edge 32 may define adjacent troughs 68. Two trailing edge panels 78 may then be joined (e.g., with adhesive) to the side wall 54 in the troughs 68 at one end and abut the feet 70 at the other end adjacent the panel 64.

Figure 5F:
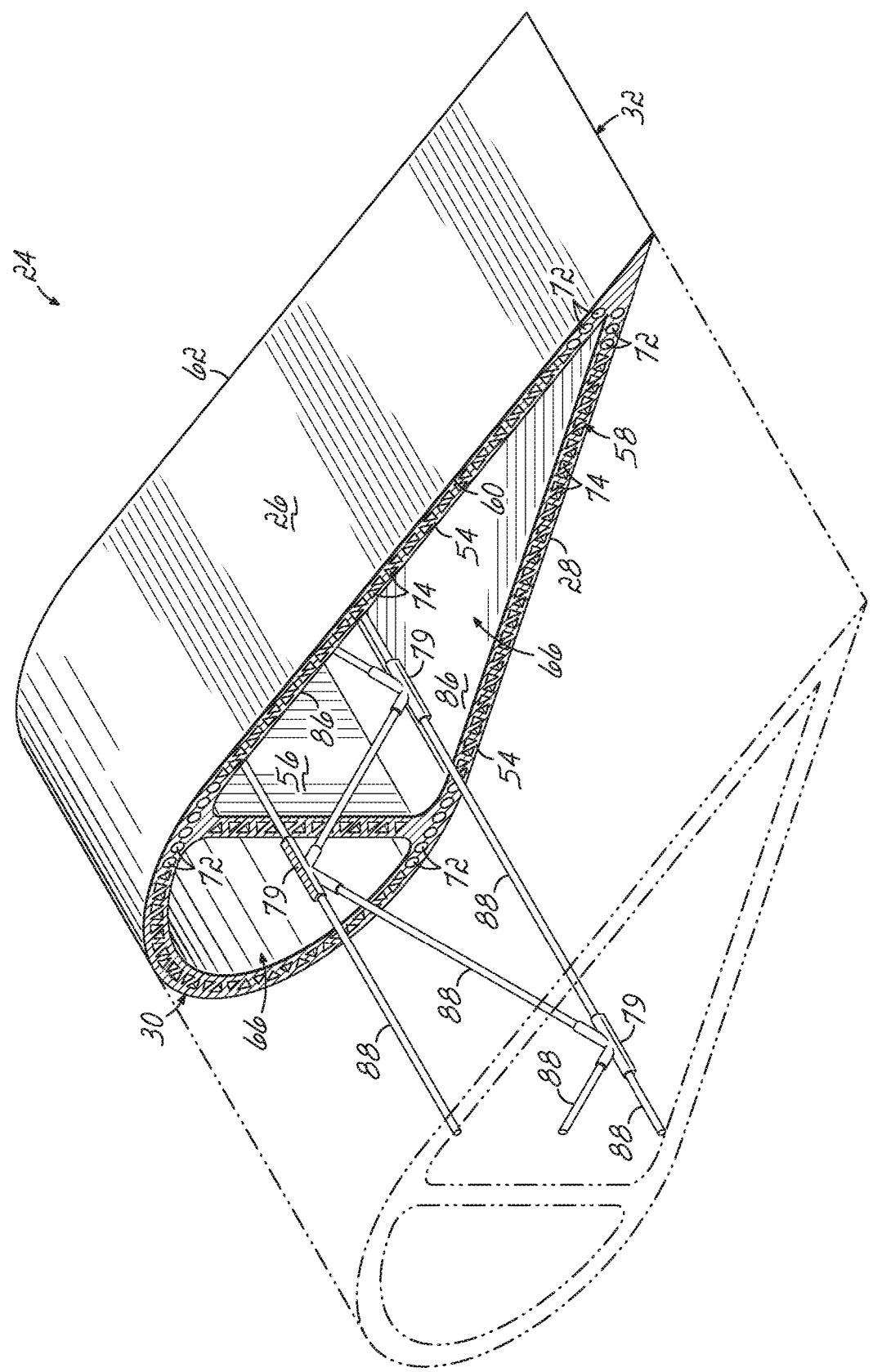
FIG. 5F is a perspective view of a section according to one embodiment of the invention.

Referring now to FIG. 5F, in one embodiment, the side wall 54 may be formed with built-in nodes or sockets 79 that may extend into the tubular portions 66 from the side wall 54. Similar to the built-in feet 70 and troughs 68, the sockets 79 receive a separate reinforcing structure, which in the representative embodiment shown, includes rods 88. During assembly of the sections 24, the rods 88 may be inserted into the sockets 79 to form a scaffold support structure within one or more of the tubular portions 66. The rods 88 may connect the sections 24 and provide longitudinal strength to the sections 24.

With reference to FIGS. 5 and 5A, in one embodiment, the side wall 54 of each of multiple sections 24 includes one or more built-in longitudinally extending bores 72. As shown, in the exemplary embodiment the bores 72 may be cylindrical (e.g., right circular cylinder) extending the length, L, of each section 24. The bores 72 may be positioned between the outer surface 26 and the inner surface 86 of the side wall 54 proximate the web 56 and between the outer surface 28 and the inner surface 86 of the side wall 54 proximate the edge 32. Although not shown, the bores 72 may be throughbores extending from end 60 to end 62 of each section 24 and are open and accessible at each end 60, 62. One or more sections 24 may comprise a blind bore or several blind bores, such as in end regions at a root or tip end of a blade.

As is described below, the bores 72 may slidably receive the longitudinally extending strengthening elements 50 during assembly of the wind turbine blade 22. In this regard, when the sections 24 are assembled and the corresponding bores 72 of each section 24 are aligned with one another, a conduit is constructed of multiple aligned bores 72. The conduit may extend the full length or near the full length of the wind turbine blade 22, as is indicated by the length of the strengthening elements 50 in FIGS. 2 and 3. As can be appreciated by the strengthening elements 50 (shown in phantom line in FIGS. 2 and 3), the section 24 that defines the tip 40 or root end 36 may not include a bore or the bore may be a blind bore and so is not open at a respective exterior surface of the tip 40 or root 36. In this way, when inserted adjacent the web 56, the strengthening elements 50 may strengthen the wind turbine blade 22 in a manner that is similar to a conventional spar cap, for example. In a blade according to the invention, at least one blade section 24 comprises a through-bore 72. In a blade according to the invention, at least two adjacent blade sections 24 comprise a through-bore 72. In a blade according to the invention, at least three adjacent blade sections 24 comprise a through-bore 72. In a blade according to the invention, at least four or more or five or more or ten or more or twenty or more adjacent blade sections 24 comprise a through-bore 72.

The number and location of the bores 72 around the circumference of the side wall 54 may depend on the design of the wind turbine blade 22. For example, the bores 72 may alternatively or additionally be positioned proximate the trailing edge 32 on the section 24 (as shown in FIG. 4). The strengthening elements 50 may therefore resist flap and edgewise loading on the wind turbine blade 22. Although not shown, the combination of bores 72 and strengthening elements 50 may be positioned in the side wall 54 at other locations.

In one embodiment, and with continued reference to FIGS. 5 and 5A, the side wall 54 may further include built-in elements 74. The elements 74 may be constructed during the printing process of the section 24 and so are built into the side wall 54. The elements 74 may be distributed equally throughout the circumference and along the length of the side wall 54 or may be placed at selected locations to enhance one or more properties of the side wall 54 at those locations. By way of example only, and not limitation, the elements 74 may be an absence of material, that is, the elements 74 may be void spaces of a predetermined 3-D shape. This may include a honeycomb structure and corrugation-like features that internally reinforce the side wall 54 due to their shape while reducing the per unit weight of the side wall 54. The configuration of the elements 74 is not strictly limited to any particular configuration and specifically is not limited to triangular shaped features shown in the figures. Although not shown, the elements 74 may be fully embedded in the side wall 54 and, in contrast to the bores 72, may not be exposed at the ends 60, 62 or be in alignment with corresponding features of adjacent sections. In other words, the elements 74 may be closed off from any surface of the section 24. As an alternative to voids, the elements 74 may be localized regions of different material that is surrounded by the material of the side wall 54. The addition of material to the side wall 54 may be to produce a composite structure in which the secondary material reinforces the structural strength of the side wall 54.

As described above, with reference to FIGS. 4, 6A, and 6B, the sections 24 are assembled end-to-end. The joint 52 may be formed between the end 60 of one section 24 and the end 62 of an adjacent section 24. By way of example, the end 60 of one section 24 may interlock with the end 62 of an adjacent section 24. In one embodiment, the ends 60, 62 abut one another and form a mechanically interlocking joint that may not require an adhesive or further processing for strength. Alternatively, the ends 60, 62 may be spaced apart and joined by an adhesive. Once the sections 24 are assembled, the plurality of side walls 54 define the leading and trailing edges 30, 32 and the surfaces 26, 28 of the wind turbine blade 22.

In one embodiment, and with reference to FIG. 6A, the end 60 of one section 24 may cooperate with the end 62 on an adjacent section 24 to form an elongated joint 52. Rather than being a butt joint in which the ends 60, 62 define planes that are substantially perpendicular to the direction of the axis 44, the ends 60, 62 may overlap one another longitudinally to produce a joint that is greater in length than the thickness of the side wall 54. As shown in the representative embodiment of FIG. 6A, the end 60 may include a relief area 80 along an outer surface of the side wall 54. The corresponding end 62 of the adjacent section 24 may include a projecting portion 82 that is configured to extend into the relief area 80. By this configuration, the joint 52 includes more surface area and so may be stronger than a butt joint. The adjacent sections 24 may be bonded together with an adhesive 84 or melted together during assembly. Depending on the configuration of the ends 60, 62, adhesive joining or melting the joint together may not be necessary.

With reference now to FIGS. 4 and 6B, in one embodiment, at the locations along the side wall 54, the ends 60, 62 may be configured to ensure that the bores 72 extending through one section 24 align with the corresponding bores 72 in an adjacent section 24. In this way, the bores 72 in each section 24 align along the length of the wind turbine blade 22 in order to receive a respective strengthening element 50. Adjacent side walls 54 may also align to produce flush exterior surfaces 26, 28.

To that end, as shown in FIGS. 5 and 6B, in one embodiment, the end 60 may include a projection 90 that is generally centrally placed within the side wall 54 and extends longitudinally therefrom. In one embodiment, at least one bore 72 coincides with the projection 90. It will be appreciated that the projection 90 may have a pin-like configuration with the bores 72 being concentrically positioned within the pin. At a corresponding location on an adjacent section 24, the end 62 may include a recess 92 that extends longitudinally within the side wall 54 and that is sized to receive the projection 90 during assembly of the sections 24. It will be appreciated that the recess 92 may be a bore that is larger in diameter than the bores 72. The bores 72 open at the base of the bore. The projection 90 and recess 92 produce a male-to-female joint. During assembly, alignment between the tubular projection 90 and the recess 92 facilitates alignment between bores 72 and adjacent sections 24 and ensures that adjacent sections 24 are properly positioned so that the strengthening elements 50 may be received in their respective bores 72. It will be appreciated that the male-to-female configuration of the projection 90 and the recess 92 may form portions of the ends 60, 62 at other locations around the circumference of the side wall 54 and does not need to coincide with the locations for the bores 72.

With reference now to FIGS. 4, 6A and 6B, the ends 60, 62 of the sections 24 may not be uniformly formed along their circumference. That is, the ends 60, 62 may vary in configuration around the circumference of the side wall 54. As is shown in FIG. 5, the configuration of the ends 60, 62 may change around the circumference of the section 24. By way of example only and not limitation, the ends 60, 62 may vary from the overlapping configuration shown in FIG. 6A to an alignment pin-type configuration shown in FIG. 6B. Other joint configurations are possible.

Figure 7:
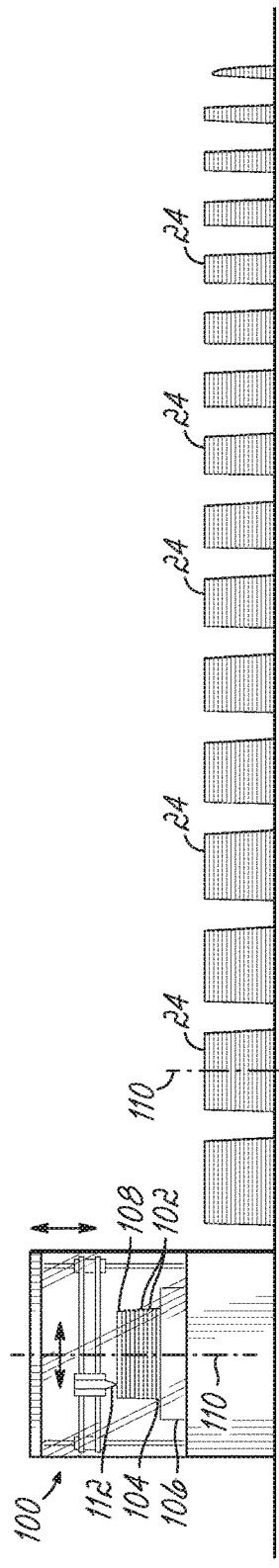
FIG. 7 is a schematic representation of manufacturing of a plurality of sections according to one embodiment of the invention.

Referring now to FIG. 7, in one embodiment, the sections 24 may be manufactured with a 3-D printing system 100. Although not shown, a digital three-dimensional model of the wind turbine blade 22 may be generated and then that model may be divided into a plurality of 3-D digital sections, each digital section corresponding to one of the sections 24. The entire digital model or the individual digital sections of the model may be transferred to the 3-D printing system 100. In the system 100, one section 24 is formed in layers from the digital model, for example, by jet printing of material to build up the section 24 in layers. The printing of the material can be by directly depositing material of which the 3-D printed section 24 is made. In one such version of the system 100, a print head 112 is arranged to jet print each layer 102. A material is deposited from the print head 112 in uniform layers 102 on the support 106 in the shape of a cross section or slice of the wind turbine blade 22 or section 24.

With the system 100, the 3-D printing process may produce the tubular structure 58 to include any one or combination of the integral web 56, built-in feet 70, built-in bores 72, built-in reinforcing elements 74, sockets 79, and/or custom ends 60, 62 described above. The sections 24 made by this process can not only have custom located built-in bores 72 but will have other custom tubular structures 58 according to the corresponding section location along the wind turbine blade 22. The sections 24 may be formed to precisely match the curvature of the pressure surface 26 and the suction surface 28 as determined by the three-dimensional model of the wind turbine blade 22.

Use of 3-D printing processes to produce wind turbine blades, preferably layer by layer, is capable of producing sections having full three-dimensional properties. These processes are particularly useful for wind turbine blades made of materials such as plastics and metals and that may not require machining. This direct 3-D printing process eliminates the need to cast custom molds for the wind turbine blade and then mold the wind turbine blade in two halves for later assembly.

In that regard, the system 100 may be used to print individual layers 102 one on top of the other with the first layer 104 being printed on the support 106. Although not shown, the layers 102, 104 may be produced with the same material, such as nylon 12 or other materials available from Stratasys®. The layers 102, 104 are not limited to any particular material and may be produced from other materials including various polymers, such as, acrylonitrile butadiene styrene (ABS), polycarbonate (PC), polypropylene (PP), polyether ether ketone (PEEK), epoxy, acrylic, polybutylene terephthalate (PBT), polyamide (PA), and combinations thereof to name only a few. These materials may be reinforced with fibers or particles, including, but not limited to, PA reinforced with glass fibers or glass particles, PA reinforced with carbon fiber or carbon particles, and PEEK reinforced with carbon fibers or particles. The layers 102, 104 may be planar in accordance with the digital data for the 3-D model of that particular section. The planes may be oriented generally perpendicular to the axis 110 on the support 106. The peripheral edges 108 of the layers 102, 104 collectively produce the aerodynamic surfaces 26, 28 and edges 30, 32 of the wind turbine blade 22. In this regard, the support 106 may determine the orientation of the layers 102, 104 relative to the axis 110. In the representative process shown, the axis 110 is generally perpendicular to the support 106 though embodiments of the invention are not limited thereto. The layers 102, 104 collectively form any single one or all of the section 24, including the web 56, feet 70, bores 72, reinforcing elements 74, sockets 79, and the ends 60, 62, if any, described above.

In particular, one of the ends 60, 62 may be formed at least by the initial layer 104 during the printing process. As such, the support 106 may generally define the plane of one of the ends 60, 62 of the section 24. The bores 72 may be built in the side wall 54 on a layer-by-layer basis and are larger in diameter than the strengthening element 50 and may measure approximately 30 mm in diameter, though embodiments of the present invention are not limited to any specific dimension of the bores 72. The reinforcing element 74 may also be built into the side wall 54 in a predetermined arrangement and orientation.

While a single 3-D printing machine 100 is shown, it will be appreciated that multiple 3-D printing machines may be utilized to more quickly produce sections 24 necessary to assemble them into the wind turbine blade 22. It will be further appreciated that the 3-D printing machine 100 may be located at the site at which the wind turbine 10 is to be installed and may be transported there by, for example, tractor-trailer, transport ship, etc. Advantageously, the 3-D printing machine and the necessary materials may be easily transported as compared to a wind turbine blade according to conventional (i.e., molding) manufacturing techniques. Once the layers 102, 104 are deposited to complete the section 24, the section 24 may be removed from the machine 100 and the process of manufacturing another section 24 according to the digital 3-D model of the turbine blade may commence.

With reference now to FIG. 8, in one embodiment, once all the sections 24 have been printed, they may be assembled in a predetermined order by matching opposing ends 60, 62 of adjacent sections 24 together. This may include applying adhesive to the ends 60, 62 prior to bringing the adjacent sections 24 together. Joining the sections 24 may include alignment of the bores 72 so that all of the types of bores 72 throughout each relevant section 24 are aligned. In addition, the axis 110 of each section 24 may be aligned to ultimately produce the axis 44 of the wind turbine blade 22. In this regard, the layers 102, 104, are oriented generally perpendicular to the axis 44 of the wind turbine blade 22. If necessary, a separate panel 64 or rod 88 may be inserted and glued within each tubular structure 58 (e.g., shown in FIGS. 5B and 5F, respectively). It will be appreciated that the panel 64 and/or the rods 88 may extend through multiple sections 24 and so installation may include inserting the panel 64 and/or the rods 88 within the multiple sections and securing the panel 64 in position.

Figure 9:
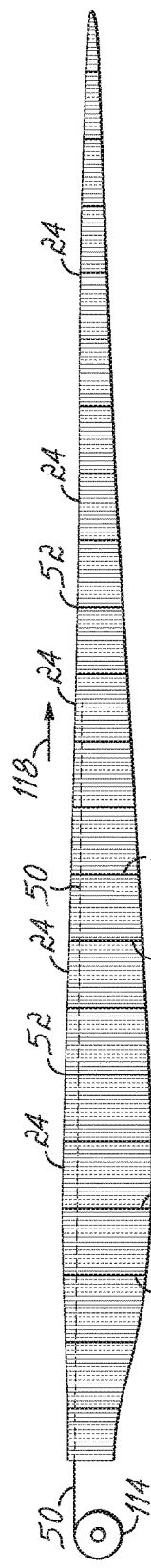
FIG. 9 is a schematic representation of the insertion of a longitudinal strengthening element according to one embodiment of the invention.

Once assembled and with reference to FIG. 9, in one embodiment, the strengthening elements 50 are inserted through the bores 72 of each relevant section 24. The strengthening elements 50 may be provided on a spool 114 that is unwound as the elements 50 are inserted through the assembled sections 24 according to arrow 118.

Once the strengthening elements 50 are inserted to the desired length and then cut, a resin material may be injected into the bores 72 to fill any void space existing between the strengthening elements 50 and the sections 24 and to secure the strengthening elements 50 within the bores 72. In that regard and with reference to FIG. 9A, in one embodiment, each section 24 may include one or more openings 116 in the side wall 54 which intersect the bores 72. During injection of a resin 124 into bore 72 and around the strengthening elements 50, vacuum may be applied (indicated by arrow 120) to the bore 72 via the opening 116. It will be appreciated that this may assist with the encasement of the strengthening elements 50 with resin and fully bonding the strengthening elements 50 to each section 24.

Figure 10:
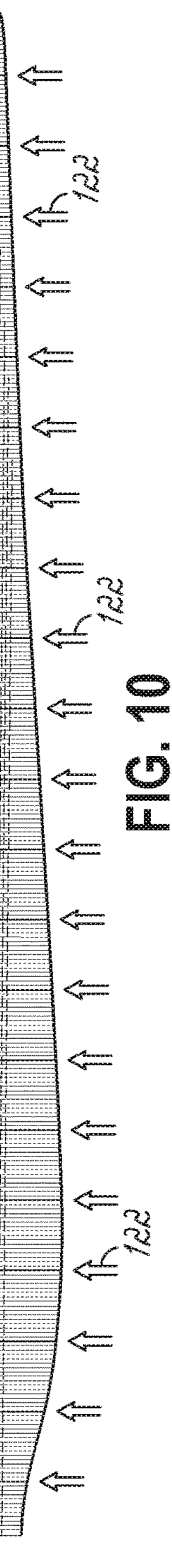
FIG. 10 is a schematic representation of finishing a portion of the wind turbine blade according to one embodiment of the invention.

Following insertion of the strengthening elements 50 and injection of any resin as described above, the assembled wind turbine blade 22 may be finished. This may include further bonding and curing of any resin; finishing the joints 52; the surfaces 26, 28; and the edges 30, 32 to remove any artifacts remaining from the printing process and/or bonding process to produce an aerodynamically clean surface as indicated by the arrows 122 in FIG. 10. Once complete, the wind turbine blade 22 may be painted. And, because the wind turbine blade 22 is manufactured at the installation site of the wind turbine 10, no transportation of the wind turbine blade 22 is required. The wind turbine blade 22 may then be mounted onto the hub 20 in accordance with normal construction of the wind turbine 10.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A wind turbine blade for mounting to a hub of a wind turbine, comprising:
   a plurality of layered sections coupled together end-to-end, each section including a leading edge, a trailing edge, and a side wall that forms a tubular structure and that includes a series of adjacent bores formed both in the side wall and closer to the leading edge than the trailing edge, wherein when the sections are coupled together end-to-end, the series of bores in the adjacent layered sections generally align to form a plurality of conduits along the plurality of sections, and
   a fiber composite strengthening element that extends through each of the plurality of conduits formed in the plurality of layered sections, the strengthening elements collectively forming a spar cap that extends along the plurality of layered sections and which is configured to reinforce the blade under load during use of the wind turbine,
   wherein the plurality of layered sections includes three or more layered sections.

2. The wind turbine blade according to claim 1, wherein at least one layered section includes an integral receptacle, and a separate structural component is secured to the tubular structure within the integral receptacle.

3. The wind turbine blade according to claim 2, wherein the integral receptacle includes feet projecting from the side wall so as to define a trough therebetween, and the separate structural component includes a panel that is secured to the at least one layered section in the trough and divides the tubular structure into at least two tubular portions.

4. The wind turbine blade according to claim 2, wherein the integral receptacle includes a socket and the separate structural component includes a rod that is received in the socket.

5. The wind turbine blade according to claim 1, wherein each layered section has a longitudinal axis and wherein at least one of the layered sections includes a layer generally defining a plane substantially perpendicular to the longitudinal axis.

6. The wind turbine blade according to claim 1, wherein the wind turbine blade includes a pressure surface and a suction surface and wherein at least one of the layered sections includes a layer with a peripheral edge forming a portion of the pressure surface and a portion of the suction surface.

7. The wind turbine blade according to claim 1, wherein at least one of the sections includes a web dividing the tubular structure into at least two tubular portions.

8. The wind turbine blade according to claim 7, wherein the web is integrally formed with the tubular structure.

9. The wind turbine blade according to claim 7, wherein the wind turbine blade includes a pressure surface and a suction surface and wherein the series of bores includes a first set of bores located proximate the pressure surface and a second set of bores located proximate the suction surface on opposite sides of the web.

10. The wind turbine blade according to claim 1, wherein the side wall includes a plurality of reinforcing structures that are encased within the material of the side wall.

11. The wind turbine blade according to claim 1, wherein the side wall includes a plurality of voids.

12. The wind turbine blade according to claim 1, wherein the side wall of each section terminates in opposing ends and a joint is formed between the end of one section and the end of an adjacent section.

13. The wind turbine blade of claim 12, wherein the end of the one section and the end of the adjacent section overlap longitudinally at the joint.

14. The wind turbine blade according to claim 1, wherein series of bores in at least one of the plurality of layered sections includes through bores extending a full length of the at least one of the plurality of layered sections.

15. A wind turbine comprising:
   a tower;
   a nacelle disposed adjacent a top of the tower; and
   a rotor including a hub and at least one wind turbine blade according to claim 1 extending from the hub.

16. A wind turbine blade for mounting to a hub of a wind turbine, comprising:
   a plurality of layered sections coupled together end-to-end, each section including a side wall that forms a tubular structure and that includes at least one bore formed therein, wherein when the sections are coupled together end-to-end, the at least one bore of adjacent layered sections generally align to form a conduit along the plurality of sections, and
   at least one strengthening element that extends through the conduit formed in the plurality of layered sections, the at least one strengthening element configured to reinforce the blade under load during use of the wind turbine, wherein the plurality of layered sections includes three or more layered sections, wherein the side wall of each section terminates in opposing ends and a joint is formed between the end of one section and the end of an adjacent section, and wherein at least a portion of the end of the one section includes a projecting portion and at least a portion of the end of the adjacent section includes a recess and the at least one bore extends through the projecting portion and opens within the recess.

17. A method of manufacturing a wind turbine blade having a plurality of sections, the method comprising:

producing digital data defining a three-dimensional model of the wind turbine blade;

dividing the three-dimensional model of the wind turbine blade into a plurality of sections, wherein the plurality of sections includes three or more sections;

manufacturing the plurality of sections based on the digital data by a process that includes depositing a material, in accordance with the digital data, layer by layer in a plurality of layers, each layer of the material being in the shape of a two-dimensional cross section of the three-dimensional model, the layers being stacked in a third dimension to define a side wall in the form of a tubular structure having a leading edge, a trailing edge, and a longitudinal length and including a series of adjacent bores formed in the side wall and closer to the leading edge than the trailing edge such that the series of adjacent bores extends at least a portion of the longitudinal length of the section;

assembling each section end-to-end with the series of bores in the adjacent layered sections being generally aligned with each other to form a plurality of conduits through the plurality of sections; and inserting a longitudinal strengthening element into each of the plurality of conduits to form a spar cap that extends along the plurality of layered sections.

18. The method according to claim 17, wherein depositing the material further comprises depositing a first layer of a material in a plane generally perpendicular to a longitudinal axis of the section, and wherein the first layer forms one end of the section.

19. The method according to claim 17, further comprising:

injecting a resin to fill voids between the longitudinal strengthening element and the conduit and securing the strengthening element within the conduit.

20. The method according to claim 17, wherein depositing the material further includes depositing the material to form an integral receptacle and the method further comprises installing a separate structural component into the integral receptacle.

21. The method according to claim 17, wherein depositing the material further includes depositing the material in such a way as to embed voids within the side wall.

22. The method according to claim 17, wherein inserting the longitudinal strengthening element into each of the plurality of conduits includes inserting the longitudinal strengthening element through a through bore extending a full length of at least one of the plurality of sections.

23. A wind turbine blade for mounting to a hub of a wind turbine, comprising:

a plurality of layered sections coupled together end-to-end, each section including a leading edge, a trailing edge, a suction surface, a pressure surface, and a side wall that forms a tubular structure and that includes a series of adjacent bores formed therein at a location of maximum distance between the suction surface and the pressure surface, wherein when the sections are coupled together end-to-end, the series of bores in the adjacent layered sections generally align to form a plurality of conduits along the plurality of sections, and a fiber composite strengthening element that extends through each of the plurality of conduits formed in the plurality of layered sections, the strengthening elements collectively forming a spar cap that extends along the plurality of layered sections and which is configured to reinforce the blade under load during use of the wind turbine, wherein the plurality of layered sections includes three or more layered sections.

* * * * *